United States Patent
Hansen et al.

(10) Patent No.: US 11,616,646 B2
(45) Date of Patent: Mar. 28, 2023

(54) KEY-MANAGEMENT FOR ADVANCED METERING INFRASTRUCTURE

(71) Applicant: Kamstrup A/S, Skanderborg (DK)

(72) Inventors: Morten Tranberg Hansen, Skanderborg (DK); Gerben Kuijpers, Skanderborg (DK); Karen Elisabeth Egede Nielsen, Skanderborg (DK)

(73) Assignee: Kamstrup A/S, Skanderborg (DK)

( * ) Notice: Subject to any disclaimer, the term of this patent is extended or adjusted under 35 U.S.C. 154(b) by 20 days.

(21) Appl. No.: 17/320,400

(22) Filed: May 14, 2021

(65) Prior Publication Data

US 2022/0247560 A1 Aug. 4, 2022

(51) Int. Cl.
    *H04L 9/08* (2006.01)
(52) U.S. Cl.
    CPC .......... *H04L 9/0897* (2013.01); *H04L 9/0877* (2013.01)
(58) Field of Classification Search
    CPC .......................... H04L 9/0897; H04L 9/0877
    See application file for complete search history.

(56) References Cited

U.S. PATENT DOCUMENTS

| 8,964,974 | B2* | 2/2015 | Holmdahl | H04L 65/40 726/28 |
| 9,306,741 | B1* | 4/2016 | Brainard | H04L 9/0861 |
| 9,401,766 | B2* | 7/2016 | Yuan | H04B 10/70 |
| 9,603,012 | B2* | 3/2017 | Kruglick | H04B 3/54 |
| 9,664,531 | B2* | 5/2017 | Le Buhan | G01D 4/002 |
| 2010/0106967 | A1* | 4/2010 | Johansson | H04W 4/70 713/168 |
| 2017/0200225 | A1* | 7/2017 | Kanungo | H04L 9/0825 |
| 2019/0253402 | A1* | 8/2019 | Kärkkäinen | H04L 63/068 |

FOREIGN PATENT DOCUMENTS

| CN | 110830997 A | 2/2020 |
| EP | 2197147 A1 | 6/2010 |

OTHER PUBLICATIONS

Extended European Search Report dated Oct. 6, 2021, for related European Patent Application No. 21173486.8.
Search Report for Danish Priority Application No. PA 2020 70324.

* cited by examiner

*Primary Examiner* — Viral S Lakhia
(74) *Attorney, Agent, or Firm* — Renner, Otto, Boisselle & Sklar, LLP

(57) ABSTRACT

A method for replacing an existing key derivation key in a utility meter arranged in a meter communication infrastructure in a secure way. The method provide a secure mechanism for exchange of symmetric keys without the need for transferring keys across the meter communication infrastructure. From the head-end system to the utility meter is transmitted a command data message comprising a request for replacing the existing key derivation key with the new key derivation key, the key-generation information and a activation key or an authentication code calculated based on the activation key. The utility meter receiving the command data message is arranged to derive the new key derivation key based on a copy of a disaster recovery key stored in the utility meter and on the key-generation information comprised in the received command data message. Further, the utility meter is arranged for deriving a activation key from the new key derivation key. The activation key is used for verifying the command data message. If the command data message is verified the existing key derivation key is replaced by a new key derivation key.

11 Claims, 3 Drawing Sheets

KEY-MANAGEMENT FOR ADVANCED METERING INFRASTRUCTURE

This application claims priority of Danish Application No. PA 2020 70324 filed May 15, 2020, which is hereby incorporated herein by reference.

FIELD OF THE INVENTION

The present invention relates to the field of methods for management of cryptographic keys in advanced metering infrastructures and especially to methods for recovery and replacement of cryptographic keys when they have been compromised or lost.

BACKGROUND OF THE INVENTION

Meter communication infrastructures such as Advanced Meter Infrastructure (AMI) systems are generally known in the art. Utility companies uses such meter communication infrastructures to read and monitor utility meters remotely, typically using Radio Frequency (RF) communication. Meter communication infrastructures increase the efficiency and accuracy of collecting readings, managing customer billing and enables data driven network management.

Meter communication infrastructures are complex and may comprise many elements and make use of multiple technologies, some of which are mentioned in the following. Advanced Metering Reading (AMR) systems generally uses a mobile RF communication network for collecting meter readings and data, whereas AMI systems often use a fixed RF communication network or power line communication (PLC). AMI systems may include multiple intermediate collectors located throughout a larger geographic area, each collector in turn communicating with a head-end system (HES), for example by using a wide area network (WAN) or other suitable communication infrastructure. An AMI system may also utilize a system of repeaters or relay devices that expand the coverage area for each reader by forwarding meter readings and data. AMI systems may be based on public cellular tele communication infrastructures such as GSM, LTE, NB-IOT or any generation of tele communication such as 3G, 4G, 5G or other communication infrastructures based on e.g. LORA or Sigfox. In a mobile network AMR environment, a handheld, vehicle-mounted, or otherwise mobile reader device with RF communication capabilities is used to collect data from utility meter devices as the mobile reader is moved from place to place.

Meter readings including consumption data and other meter data such as flow, temperature, pressure, Voltage, current etc. are most often considered confidential information, which must be protected preventing unauthorized access or manipulation of the data. Main objects of the protection is to ensure confidentiality/privacy and authenticity of the transmitted data. Further authentication and authorization may be objects in an advanced metering infrastructure. One way of protecting meter readings, other meter data and meter functionality is by use of cryptographic methods. Cryptographic methods use cryptographic keys in the following just named keys.

Confidentiality/privacy may be provided by encrypting data by use of a cryptographic method such as the Advanced Encryption Standard (AES). Meter data may be encrypted at the transmitting device, e.g. the meter, using a key and decrypted at the receiver, e.g. a Head-end system, HES, using the same key. When data is encrypted and decrypted using identical keys the keys are called symmetrical keys.

Authenticity of data may be provided by use of a Message Authentication Code (MAC). A MAC is calculated in the transmitter end based on the data to be protected using a cryptographic method and a key and recalculated at the receiver based on the cryptographic method, the key and the received data.

The use of end-to-end encryption and message authentication based on symmetric keys provides a relative simple and very reliable data protection scheme, by which the communication link between utility meters and the head-end system is protected/secured. However, if the keys used are compromised, the communication link between the head-end-system and the utility meter is no longer secure. The communication link protected by compromised keys can no longer be used for replacing the compromised keys in the utility meters with new keys in a secure way. With systems often including thousands or even millions of meters, manually replacement of keys is also not a viable solution. Keys may be compromised because a third party has gained unauthorized access to the keys or the keys may have been lost i.e. they are no longer accessible e.g. due to hacker attacks or a computer virus.

A need therefore exists for a method and supporting system for safe and efficient replacement of compromised keys in meter reading system, in particular in systems using symmetric keys and end-to-end communication. Especially replacement of the keys in utility meters installed at consumers through the meter communication infrastructure requiring no service visit is desired.

OBJECT OF THE INVENTION

An object of the present invention is to provide a secure, reliable and effective method and system for replacing keys including compromised keys in utility meters through a meter communication infrastructure.

SUMMARY OF THE INVENTION

Thus, the above described object and several other objects are intended to be obtained in a first aspect of the invention by providing a method for replacing an existing key derivation key in a utility meter arranged in a meter communication infrastructure for communication with a server side comprising a head-end system, the method comprising the steps of:—deriving at the server side a new key derivation key based on a disaster recovery key, stored at the server side, and a key-generation information;—deriving at the server side an activation key from the new key derivation key;—transmitting from the head-end system to the utility meter a command data message comprising: a request for replacing the existing key derivation key with the new key derivation key; the key-generation information; and the activation key or an authentication code calculated based on the activation key;—receiving in the utility meter the command data message;—deriving in the utility meter the new key derivation key based on a copy of the disaster recovery key stored in the utility meter and on the key-generation information comprised in the received command data message;—deriving in the utility meter the activation key from the new key derivation key;—verifying in the utility meter the activation key or the authentication code received in the command data message, based on the derived activation key; and—replacing in the utility meter the existing key derivation key with the new key derivation key when the activation key or authentication code comprised in the received command data message is verified.

The method has the advantage that request for replacing the existing key derivation key can be generated independent of the state or the current/existing key derivation key in the utility meter. This means that even in a situation where the existing key derivation key is unknown to the server side/head end system a request for replacing the existing key derivation key can be generated and executed by the method. Further, the method has the advantage that a third party getting unauthorized access to the key derivation key will not be able to replace the existing key derivation key and take over control of the utility meter. Yet another advantage is the self-authenticating effect of the command data message caused by the activation key which is derived from the new key derivation key whereby possession of the new key derivation key is proven and required for generation of the command data message. A further advantage is that the key derivation key does not have to be transferred over the meter communication infrastructure and that the command data message may in fact be transmitted in clear text, which has the effect that no secure channel between the utility meter and the head end system/server side and field side is required for replacing the key derivation key.

By verifying the activation key or the authentication code is understood that the utility meter approves the activation key or the authentication code. So if the activation key or the authentication code is approved it is said to be verified. Approving/verifying the activation key or the authentication code may as an example be done by comparing the received and the derived activation key or the authentication code and if they are identical the received activation key or the authentication code is verified/approved. If the activation key or the authentication code comprised in the received command data message is verified the existing key derivation key in the utility meter is replaced with the new key derivation key. If the activation key or the authentication code comprised in the received command data message is not verified the existing key derivation key in the utility meter is not replaced with the new key derivation key. In other words the method may comprise the steps of:—deriving in the utility meter the activation key and/or the authentication code from the new key derivation key;—using in the utility meter the derived activation key and/or the authentication code for verifying the correctness of the activation key and/or the authentication code received in the command data message;—if the correctness of the received activation key and/or the authentication code can be verified replace in the utility meter the existing key derivation key with the new key derivation key and if the correctness of the received activation key and/or the authentication code can not be verified discard the new key derivation key without replacing the existing key derivation key in the utility meter. As an example the correctness of the received activation key and/or the authentication code may be verified if it is identical to the derived activation key and/or the authentication code. As an equivalent alternative in all the above mentioned method steps the derived activation key and/or the authentication code may be said to be verified based on the activation key and/or the authentication code received in the command data message.

It may be especially advantageous if the server side disaster recovery key is stored in a secure environment. As a secure environment is understood an environment with limited access or an environment separated from the head end system. Alternatively the secure environment may be a hardware secured module or a server and may have a physical location different from other elements of the server side.

The new key derivation key at the server side may be derived in the secure environment before being transferred to the head-end system or key management system. This has the advantage that the disaster recovery key can be kept within the secure environment. It is an advantage of the invention that the collection of disaster recovery keys of all the utility meters are kept in a secure environment. This means that an attacker has to gain access to the secure environment or each of the utility meters to gain access to the collection of disaster recovery keys. Especially the disaster recovery key for use at the server side may be stored in a secure environment in form of a hardware security module.

The method according to the first aspect may optionally be seen as a method for replacing an existing key derivation key in a utility meter and in a server side and/or head end system and the method may then comprise a further step of storing the new key derivation key in the server side and/or head end system.

In a second aspect of the invention is provided a command data message for replacing an existing key derivation key in a utility meter with a new key derivation key, the command data message comprising:—a request for replacing the existing key derivation key with the new key derivation key; key-generation information;—an activation key or an authentication code calculated based on the activation key; characterized in that the activation key is derived based on the new key derivation key, and the new key derivation key is derived based on at least the key-generation information. Such a command data message has the advantage of being self-authenticated based on the new key derivation key with which it request the utility meter to replace the existing key derivation key. A further advantage is that the message may be sent in clear text as the new key derivation key is not contained in the message. The request for replacing the key derivation key may be explicit indicated in the command data message or it may be implicit stated in form or e.g. a command ID which indicates the desired request.

The activation key or authentication code comprised in the command data message has the purpose of providing means for verifying one or more of the following: authenticity of the command data message, authorization of the head-end system, authentication of the head-end system. Or with other words The activation key or authentication code comprised in the command data message has the purpose of providing evidence of possession of the new key derivation key by the entity generating the command data message.

The command data message according to the second aspect may be a command data message wherein the new key derivation key is not comprised in the data command message. And it may be a command data message send as clear text.

The command data message may be a data physical message transmitted over a transmission channel such as a radio communication channel or a wired communication channel or a message stored in a memory device for data storage.

In a variant of the second aspect of the invention a memory device for data storage arranged for storing the command data message is provided. In another variant of the second aspect a communication device, such as a radio communication device, arranged for transmitting or receiving the command data message according to the second aspect is provide.

In a third aspect of the invention is provided a utility meter arranged for communication with a head-end system in a meter communication infrastructure, the utility meter comprising:—a communication interface for interfacing the meter communication infrastructure;—a disaster recovery key, stored in a memory of the meter;—an existing key derivation key;—a key derivation function; characterized in that the utility meter is configured to:—receive a command data message according to the second aspect of the invention, via the communication interface;—derive a new key derivation key by inputting to the key derivation function at least the disaster recovery key stored in the utility meter and the key-generation information comprised in the received command data message;—derive an activation key from the new key derivation key;—verify the activation key or the authentication code received in the command data message, based on the derived activation key; and—replace the existing key derivation key with the new key derivation key when the activation key or authentication code comprised in the received command data message is verified.

The utility meter has the advantage that it is enabled to verify the command data message and replace the key derivation key in a secure manner even in the case when the key derivation key has been compromised.

By verifying the activation key or the authentication code is understood that the utility meter approves the activation key or the authentication code. So if the activation key or the authentication code is approved it is said to be verified. Approving/verifying the activation key or the authentication code may as an example be done by the meter comparing the received and the derived activation key or the authentication code and if they are identical the received activation key or the authentication code is verified/approved. If the activation key or the authentication code comprised in the received command data message is verified the existing key derivation key in the utility meter is replaced with the new key derivation key. If the activation key or the authentication code comprised in the received command data message is not verified the existing key derivation key in the utility meter is not replaced with the new key derivation key. In other words the utility meter may be arranged to derive the activation key and/or the authentication code from the new key derivation key by use of the derived activation key and/or the authentication code and for verifying the correctness of the activation key and/or the authentication code received in the command data message and if the correctness of the received activation key and/or the authentication code can be verified replace in the utility meter the existing key derivation key with the new key derivation key and if the correctness of the received activation key and/or the authentication code can not be verified discard the new key derivation key without replacing the existing key derivation key in the utility meter. As an example the correctness of the received activation key and/or the authentication code may be verified if it is identical to the derived activation key and/or the authentication code. As an equivalent alternative in all the above mentioned method steps the derived activation key and/or the authentication code may be said to be verified based on the activation key and/or the authentication code received in the command data message.

The utility meter according to the third aspect of the invention may further be arranged for secure communication with the head-end system using application keys derived in the utility meter using the key derivation key. This has the advantage that the replacement of the key derivation key further will require replacement of all application keys.

In a fourth aspect of the invention is provided a meter communication infrastructure, such as a meter reading system, for replacing an existing key derivation key, the communication infrastructure comprising:—a plurality of field side utility meters; a server side head-end system configured for secure communication with the field side utility meters using application keys derived at both the server side and the field side using the key derivation key; and a server side secure environment for storing a disaster recovery key; wherein the server side is configured to derive a new key derivation key based on a disaster recovery key stored in the secure environment, and on a key-generation information; and wherein the field side utility meters are configured for receiving a command data message from the head-end system instructing the utility meter to derive a new key derivation key identical to the key derivation key derived at the server side, using a disaster recovery key stored in the utility meter and based on key-generation information received in the command data message.

This meter communication infrastructure has the advantage that key derivation keys may be replaced in a secure manner even in the case when the existing key derivation key has been lost or has become available to a fraudulent third party.

The server side may further be configured for acquiring existing key-generation information about the existing key derivation key from the utility meter and deriving the key-generation information for the new key derivation key on at least the acquired existing key-generation information.

In the meter communication infrastructure according to the fourth aspect of the invention, the server side may further comprise:—a head-end system configured for building and sending the command data message to the utility meters and/or to acquiring existing key-generation information about the existing key derivation key from the utility meter; and—a secure environment configured for deriving the new key derivation key.

Further, the secure environment of the meter communication infrastructure may be used for storing the disaster recovery key protected by a hardware security module (HSM).

In the meter communication infrastructure according to the fourth aspect of the invention, the utility meter may be a utility meter according to the third aspect of the invention and the meter communication infrastructure may be arranged to perform the method according to the first aspect of the invention.

In the first, second, third and fourth aspect of the invention optionally at least one of the key derivation key, disaster recovery key or activation key is a symmetric key. Optionally all of the keys are symmetric keys. The inventions are especially advantageous with respect to symmetric keys since replacement of symmetric keys require a secure method for preventing the keys from being compromised.

BRIEF DESCRIPTION OF THE FIGURES

The meter communication infrastructure and methods for replacement of keys according to the invention will now be described in more detail with regard to the accompanying figures. The figures show one way of implementing the present invention and is not to be construed as being limiting to other possible embodiments falling within the scope of the attached claim set.

DETAILED DESCRIPTION OF EMBODIMENTS

Figure 1:
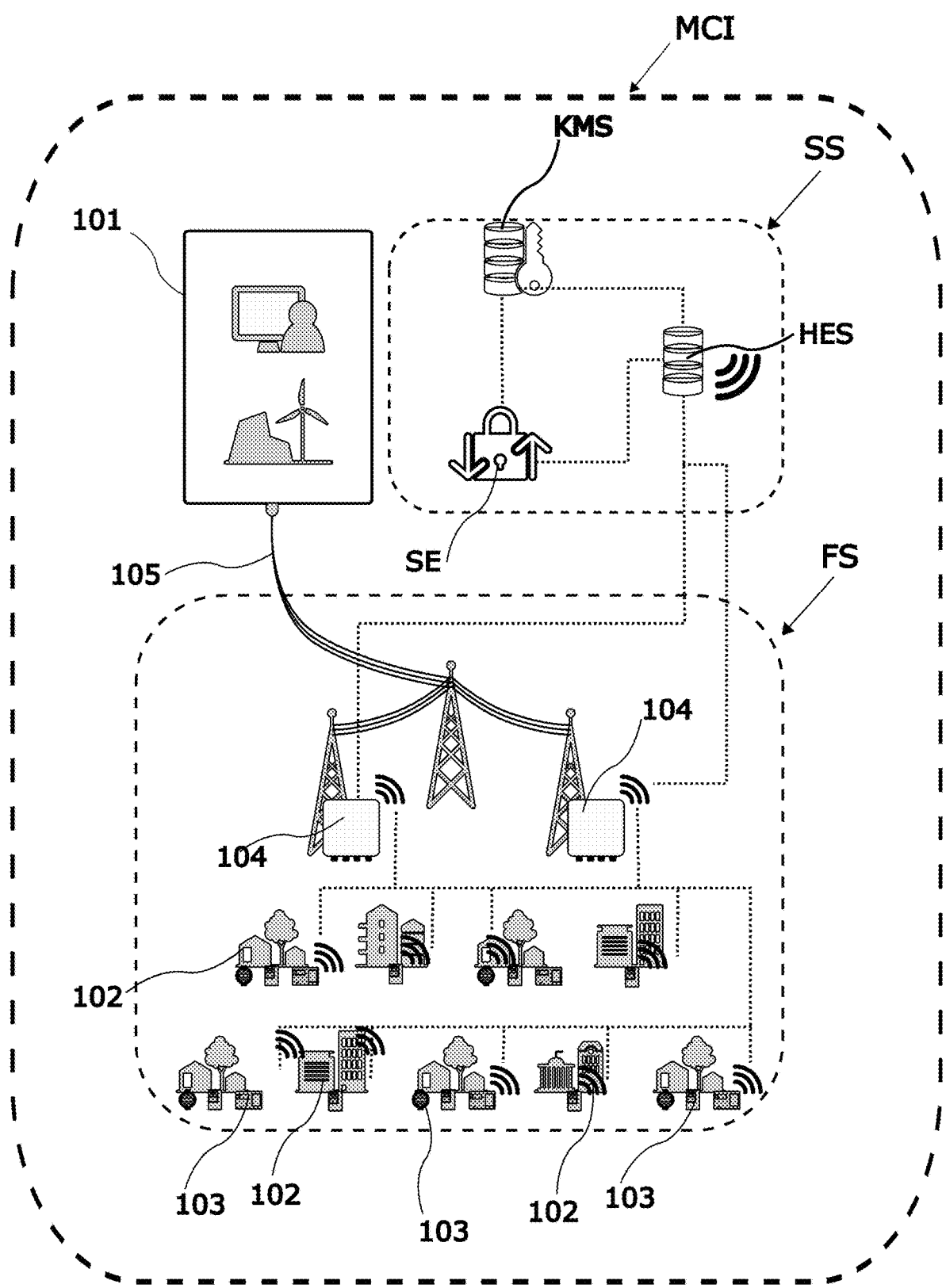
FIG. 1 is a schematic representation of a meter communication infrastructure.

Referring to FIG. 1, a meter communication infrastructure, MCI, is illustrated. Consumers, 102, such as private, residential, commercial and industry consumers, receive electricity or another utility such as water, district heating or gas, from the utility provider, 101, via a utility distribution network, 105. Depending on the utility and in particular in the case of electricity, the consumer may also generate the utility themselves or receive the utility from a decentralised production facility. The utility received or transmitted by each consumer is measured by a utility meter, 103, located at what is denoted the field side, FS, of the meter communication infrastructure, MCI. The utility meter,103, may be an electricity meter, a water meter, a heat—or cooling meter, a gas meter, a heat cost allocator or any other form of utility meter or consumption meter.

Meter data from each of the utility meters 103 is collected via a meter communication infrastructure, MCI, further comprising centrally located data collectors, 104, and a head-end system, HES, located at what is denoted the server side, SS, of the meter communication infrastructure, MCI.

The meter communication infrastructure, MCI, comprises all elements, apparatuses and equipment included in measuring consumption, reading and transporting metered data and storing, processing, presenting and exporting metering data. The meter communication infrastructure, MCI, is logically divided in a field side, FS, and a server side, SS.

The field side, FS, includes one or more of the following: utility meters, sensors, actuators, such as breakers or valves. All these elements may be installed at consumers or in the utility distribution network both belonging to the field side, FS. Devices such as collectors, routers, repeaters, gateways and base stations may also be considered field side elements.

The server side, SS, may include multiple servers, computers and cloud solutions which may be located at different geographic locations and running multiple server side applications such as the head-end system, meter management systems, key management systems etc.

The meter communication infrastructure, MCI, may at least partly comprise a public cellular network based on GSM, LTE or other cellular network technologies including 3G, 4G or 5G cellular telecommunication. Such cellular networks may be a part of the communication link between the field side and the server side, SS. The utility meters may communicate directly with the public cellular network whereby no collectors are needed in between. Collectors or gateways may be connected to the public cellular network and provide a secondary communication link between the collector and the utility meters. Other technologies such as Sigfox, LORA, NB-IOT or other internet of things infrastructures may be a part of the communication link between the meter/field side, FS, and the server side, SS. The meter communication infrastructure creates a communication link between the meter/field side, FS, and the server side, SS, this communication link is not limited to one technology and may comprise a mixture of different technologies chained together for establishing an end to end communication link.

Communication between the field side, FS, and server side, SS, is protected by cryptographic methods which have one or more of the following effects: preventing fraud, eavesdropping and unauthorized access to data and functionality in the utility meters or other elements of the meter communication infrastructure, MCI. The cryptographic methods rely on the entities taking part in the communication having access to the required keys. The cryptographic methods does only have the mentioned effects provided that the keys used for protecting the communication are not compromised i.e. unauthorized persons must not have access to the keys. If the keys are compromised they must be replaced in a secure way. In the following a method for secure replacement of compromised keys in a utility meter is disclosed along with a meter, a system and command data message all arranged function according to the method.

In the following description when data is said to be transmitted from the utility meter and received in the Head-end system, HES, i.e. from the field side to the server side, this may be understood as a direct transmission between the two sides or as a transmission including intermediate devices such as routers, repeater, collectors, base stations, WIFI routers, cellular network base stations etc. In some of the communication steps between the field side and the server side additional security layers may be used such as Transport Layer Security (TLS). Such additional security layers are not considered in this description which only considers the end to end encryption between the field side and the server side i.e. between the utility meters and the head-end system. The meter communication infrastructure is understood to be a two way communication infrastructure. When communication direction e.g. from utility meter to head-end system, HES, is indicated it is only to be understood as an example, the direction of communication may as well be the opposite.

The meter data is encrypted in the utility meters at the field side and transmitted to the head-end system at the server side, SS, via the concentrators or other intermediate devices without being decrypted before being received in the head-end system, HES, this is called end to end encryption. Encryption—and decryption in the utility meter and head-end system, respectively, is accomplished using symmetric keys. As envisaged by the skilled person, data messages may also be transmitted in the opposite direction from the head-end system to the utility meter. Such data transmission may be used for transmission of any kind of data from the head-end system, HES, to the utility meter. An example of data to be transmitted from the head-end system to the utility meter is a command arranged to: control the operation of the utility meter, to change configuration parameters of the utility meter, to change keys, to provide firmware updates etc. Encryption of the data ensures at least confidentiality/privacy of data but may also have other purposes such as replay protection. Further, specific applications or access rights may be associated with the key used for encryption of data. In this way commands may only be executed if encrypted with a specific key or read/write access to different registers and memory areas may be protected by different keys.

Whether data is transmitted to or from the utility meter, it is important that the communication link is secure to prevent manipulation of the transmitted data and unauthorized access to or operation of the utility meter. This may be accomplished by data encryption alone or a Message Authentication Code (MAC) may be included in the data message. The message authentication code may be calculated on the data to be transmitted and other data using a suitable cryptographic function such as the C-MAC, CBC-MAC, HMAC or any other MAC function. The MAC has the purpose of ensuring authenticity of the data and/or authentication of the transmitting entity. The MAC may also be used for authorization purposes. The MAC is in the following also just called an Authentication Code (AC) and may have one or more of the abovementioned functions. The terms message authentication code, MAC, and authentication code, AC, are used interchangeably in the following description.

In the following when a communication is said to be secured by use of a key it is to be understood as that key being used for one or more of the above mentioned purposes of ensuring confidentiality/privacy, replay protection, authenticity of data, authentication/authorization of an entity taking part in the communication. This may include data being encrypted by use of the key and/or the data or transmitting entity being authenticated or authorized by a Message Authentication Code (MAC) calculated based on the key.

The keys used are 128 or 256 bit symmetric keys which are commonly used key lengths e.g. for use with the Advanced Encryption Standard (AES128/AES256). The length of the key may be any suitable length providing the desired level of security for the application. The length of the key is as such not essential to the invention and may be any length suitable for the used encryption algorithm. The key length may influence the crypto period i.e. the period that the key can be used without being replaced and still providing the desired level of security. The keys may provide a crypto period exceeding the lifetime of utility meters if operated according to normal use.

The cryptographic methods used are based on the Advanced Encryption Standard (AES128/AES256) but any other symmetric encryption algorithm such as DES, triple DES may be used. If the cryptographic method used is a block cipher a mode of operation such as cipher block chaining (CBC), Counter Mode (CM) or other modes may be used. Cryptographic methods and selection of modes of operation are well known to the skilled person and is not disclosed further. For references on how to use cryptographic methods and modes of operation references is made to NIST publications FIPS 197 Nov. 26, 2001, NIST special publication SP 800-67 Rev. 2 November 2017 and NIST FIPS PUB 46-3 and NIST SP 800-38A December 2001 and NIST SP 800-38B Oct. 6, 2016 and NIST SP 800-38C May 12, 2004.

Figure 2:
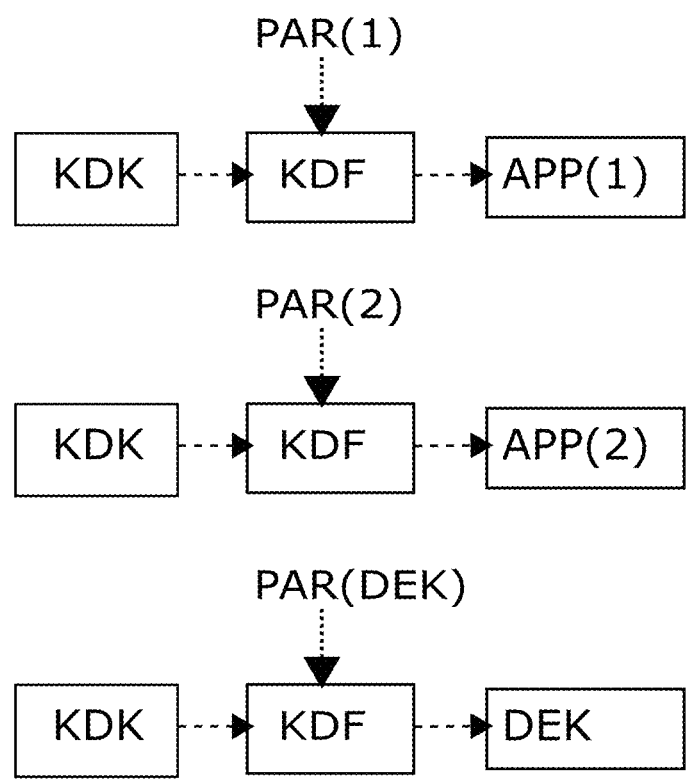
FIG. 2 illustrates key derivation.

Referring to FIG. 2, the use of different keys is described. The general operational communication between head-end system, HES, and utility meters, 103, is secured using application keys, APP. Different applications keys, APP, may provide access to different functionality and/or data in the utility meters and to different ways of communicating with the meters. One application key may for example be used for reading meter data locally whereas another application key may be used for remote reading of meter data. Another application key may be used for changing settings in the meter or to update the meter firmware. Yet another application key may be reserved for encryption of data in general or specific types of data. In this way any specific utility meter data or functionality may be secured by a specific application key.

Application keys, APP, for different applications are derived from a Key Derivation Key, KDK, as illustrated in FIG. 2. Applications keys are derived from the key derivation key, KDK, by use of a Key Derivation Function, KDF, which take as input the key derivation key and at least one additional parameter, PAR, which identifies the application. Referring to FIG. 2, if the a first parameter, PAR(1), is inputted to the key derivation function, KDK, a first application key, APP(1) is output from the key derivation function. If a second parameter, PAR(2), is inputted to the key derivation function an second application key, APP(2), is output from the key derivation function. Preferably the first and the second application keys, APP(1), App(2) and the key derivation key, KDK, are all unrelated, i.e. one key does not contain information about the other key. To ensure this a proper key derivation function must be used. Such a key derivation function, KDF, may be HKDF described in IETF RFC5869, ISSN: 2070-1721, May 2010, further specific techniques on key derivation is found in NIST SP 800-56C, April 2018. Other suitable key derivation functions may be used.

When a key is said to be based on or derived based on a specific key it is to be understood as that key is derived using a key derivation function, KDF, to which that specific key and optionally key-generation information such as a parameter, PAR, and/or optionally version information relating to the key is input and the key is then the output from the key derivation function, KDF.

The application keys, APP, are derived independently in the utility meter/field side and head-end system/server side based on at least the key derivation key KDK and an additional parameter, PAR, using the key derivation function, KDF. This has the effect that the application keys, APP, does not need to be distributed to the server side, SS, or meter/field side, FS, whereby the risk of compromising the key is reduced.

Since the key derivation key, KDK, in the utility meter and in the head-end system are identical and identical key derivation functions are used at server side and field side only the parameter, PAR, needs to be exchanged to generate identical application keys, APP, or other keys in the meter and the head-end system, HES. Even though the key derivation function and the parameter, PAR, are both known it is not possible to derive the application key, APP, without knowing the key derivation key, KDK. This has the effect that the parameter, PAR, may be transferred between the field side and the server side in clear text.

According to best practice key sanitation should be performed at regular intervals as a preventive measure. During key sanitation application keys are automatically replaced by new application keys derived from the key derivation key, KDK, which is not changed. The Utility meter and head-end system may be configured to automatically replace application keys at specific intervals. To support this it is beneficial if all key have versions or generations. Version or generation information may be included in the parameter, PAR, used for key derivation.

The application keys, APP, are generated independently in the utility meter and head-end system based on the key derivation key KDK, which in turn is generated based on a disaster recovery key DRK. The disaster recovery key, DRK, is a special key only used in case the key derivation key, KDK, is compromised or needs to be replaced due to other causes. The purposes of the disaster recovery key, DRK, is to provide a secure way of replacing the key derivation key, KDK, in the meter communication infrastructure, MCI.

The disaster recovery key, DRK, is never used directly for data encryption or generation of message authentication codes. The disaster recovery key, DRK, is only used for deriving key derivation keys, KDK. The key derivation key, KDK, is never used directly for data encryption or generation of message authentication codes. The key derivation key is only used for deriving other keys Referring to FIG. 3 disaster recovery based on the disaster recovery key, DRK, is described in details. Disaster recovery includes a secure method for replacing an existing key derivation key, KDK, by a new key derivation key in the server side, SS, as well as field side, FS, i.e. in the head and system and in the utility meters and any other component of the server side and field side. Disaster recovery provides measures for secure key replacement in the utility meters through the meter communication infrastructure even in the case when the existing key derivation key, KDK, has been compromised. Disaster recovery as described in the following includes a method for replacing an existing key derivation key, a utility meter arranged for disaster recovery, a command data message for requesting replacement of the key derivation key in a utility meter or component of the side and a meter communication infrastructure arranged for disaster recovery.

The disaster recovery key, DRK, for a given utility meter is generated during manufacturing and stored in a memory of the utility meter 102. A copy of the disaster recovery key is also transferred to a secure environment, SE, at the server side, SS. The secure environment, SE, may be protected by or may be a hardware security module. Also, the secure environment may be an offline facility, i.e. the secure environment may not be connected to the internet or any external communication network. The secure environment, SE, is a part of the server side, SS, but may be physically located at a separate location or a different location than other parts of the server side such as the head-end system, HES. In this way identical disaster recovery keys, DRK, are stored in the meter/field side, FS, and at the server side, SS.

During manufacture, configuration, customization or installation of the utility meter, 102, the key derivation key, KDK, is also derived from the disaster recovery key, DRK, using a key derivation function, KDF, to which the disaster recovery key, DRK, and key-generation information, KGI, is inputted. The key derivation key is then transferred to the head-end system, or to a key-management system, KMS, from which the key derivation key may be transferred to the head-end system. The key derivation key is also provided to the utility meter, 102, during manufacture or installation, either by transferring the key derivation key, KDK, to the utility meter or by the utility meter being instructed to derive the key derivation key, KDK, itself from the disaster recovery key, DRK, and the same key-generation information, KGI. In different embodiments various keys may be generated at different times and at different locations. The crucial part being that the disaster recovery key, DRK, is only stored in the utility meter, 102, and in the secure environment, SE, and the disaster recovery key is not used directly for encryption, decryption or authentication but only used for derivation of new key derivation keys. The disaster recovery key, DRK, is preferably not stored in the head-end system, HES. The secure environment may as an alternative be integrated in the head-end system. Transferring of keys, KDK, DRK, to the utility meter during production is only considered secure if the production facility is a secure environment.

In the utility meter and the head-end system or key-management system, the application keys, APP, are independently derived from the key derivation key, KDK. In one embodiment, application keys may be derived in the utility meter and the head-end system HES or key-management system KMS for the first time when an application key is needed. An application key may be needed in a utility meter when someone tries to access or interact with the meter. In the head-end system a key may be needed when the head-end system has to communicate with a utility meter to either receive or transmit data. It is understood by the skilled person that the key hierarchy may be extended with additional levels, i.e. keys may be derived from the application keys, APP, which would add a level to the key hierarchy.

The head-end system, HES, and key-management system, KMS, are computer implemented system run on computers or serves to execute various tasks and store information. A main functionality of the head-end system is to control, coordinate and effectuate communication with utility meters included in the meter communication infrastructure, MCI, this may also include collection of consumption data from the utility meters. The head-end system may comprise multiple sub-systems running on different computers or servers. Such subsystems may provide different user interfaces and application interfaces for various system integrations. A main functionality of the key-management system, KMS, is to manage the key derivation key and the derivation of application keys. The functionality of the key-management system may be integrated in the head-end system. Alternatively, the key-management system may operate as a separate system communicating with the head-end system. The key-management system may serve one or a plurality of head-end system.

In the following is described in details how an existing key derivation key, KDK1, is replaced with a new key derivation key, KDK2. The new key derivation key, KDK2, is identical in the server side, SS, and the field site, FS,/ meter. The existing key derivation key, KDK1, in the field side, FS, /meter may be identical to or different from the existing key derivation key, KDK1, in the server side, SS. The replacement of key derivation keys has the effect that the key derivation key, KDK, in field site, FS, /meter and server site, SS, becomes identical and the procedure is secure and reliable no matter if the existing key derivation keys, KDK1, in server side and field side are identical or not.

In the event that an existing key derivation key, KDK1, used by a utility meter or the head-end system is compromised, that key derivation key and all application keys, APP, derived from that key derivation key should be replaced. As a key derivation key can be used to derive new application keys it is insufficient to simply change to a new application keys i.e. derive new application keys from the compromised existing key derivation key, KDK1. Instead a new key derivation key, KDK2, must be derived for the utility meter and implemented in the utility meter and the head-end system or key-management system. The process of implementing one or more new key derivation keys, KDK2, may also be referred to as a disaster recovery process.

Figure 3:
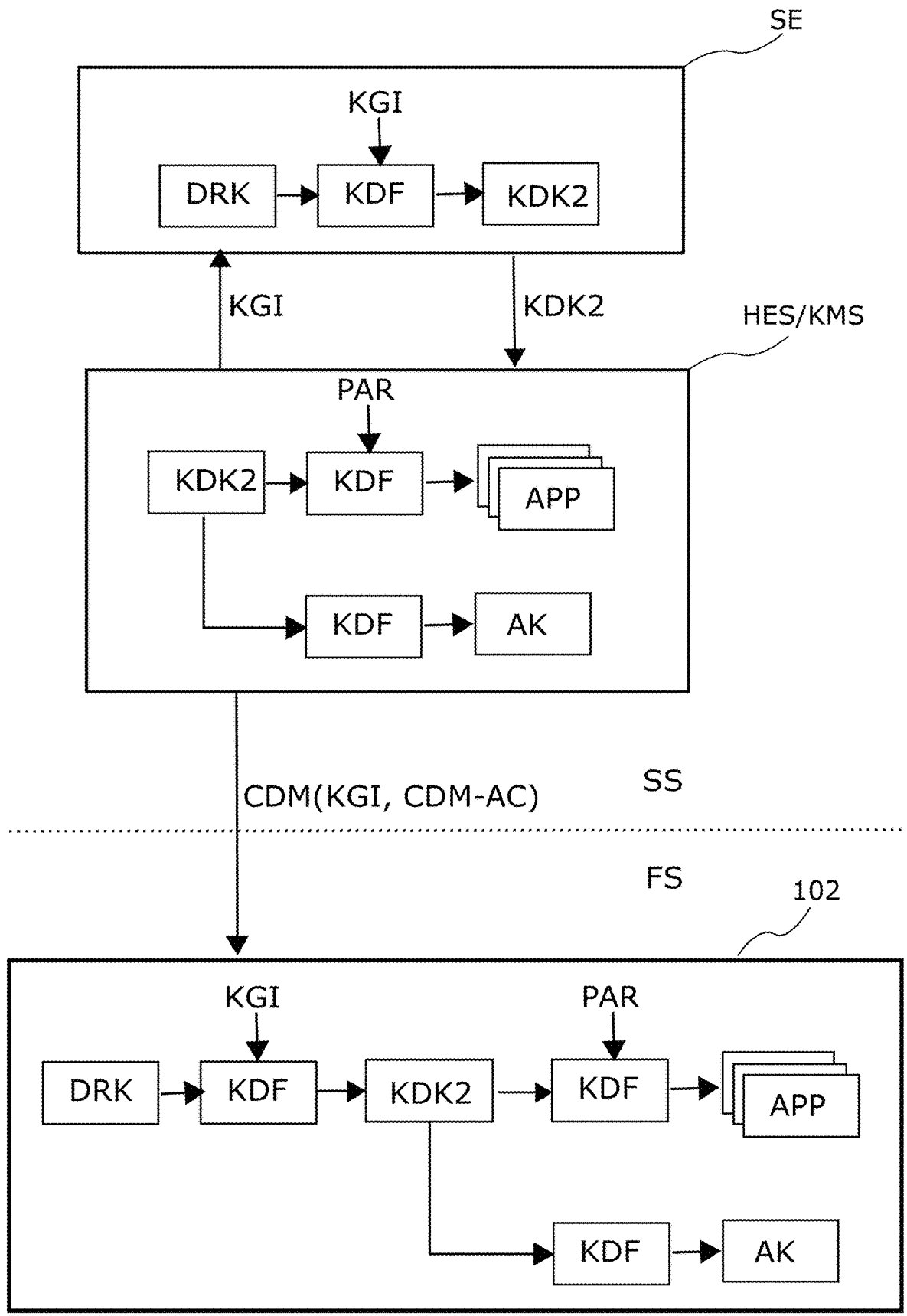
FIG. 3 illustrates how a new key derivation key is propagated between server side and field side locations.

FIG. 3 illustrates a simplified meter communication infrastructure, MCI, with a server side, SS; and a field side, FS, separated by a dotted line. Communication between server side and field side is provide by any suitable communication link as described above.

The disaster recovery process must be repeated every time a key derivation key is compromised or is considered being in risk of being compromised. The process is repeated for each utility meter having a compromised key derivation key. The utility meter and/or head-end system and/or key-management system track how many times a key derivation key has been replaced for a given meter and stores version information related to the key derivation key in use. When a given version of a key derivation key KDKx has been compromised and disaster recovery has been initiated, the head-end system at the server side acquire version information relating to the compromised key derivation key. Version information may be stored in the head-end system, key-management system or in any other system. In case the version information is not available this information may be acquired from the utility meter in an alternative secure way Based on at least the version information, key-generation information, KGI, is generated at the server side, SS. If the version information is unavailable a leap in version numbers may be made to ensure generation of new key generation information. Alternatively the key-generation information, KGI, may be generated on other information, such as a random or pseudo random number or on date information. The key generation information shall preferably not be reused. Checks that the key generation information is not reused may be included in the server side and field side, such as in the secure environment and the utility meter respectively. If the key generation information is based on time/date information it may be required that this information is within a certain range of actual date and time to be accepted as valid key generation information, KGI.

Based on the key-generation information, KGI, a new key derivation key, KDK2, is derived at the server side using the disaster recovery key, DRK, stored in the secure environment, SE, and the key derivation function, KDF. The new key derivation key, KDK2, is preferably derived in the secure environment, SE, and then transferred to a trusted and clean environment, such as a new instance of the head-end system or key-management system, to ensure that the new key derivation key, KDK2, are not compromised. Alternatively, the derivation of the new key derivation keys may take place in the key-management system or in the head-end system.

To request replacement, in the utility meter, of the existing key derivation key, KDK1, with the new key derivation key, KDK2, a command data message, CDM, is send from the server side/head-end system to the utility meter.

Since the keys used for securing the communication between the head-end system and the utility meter have been derived from the possibly compromised existing key derivation key, KDK1, the communication link between the server side and the field side may not be secure. Consequently, the new key derivation key, KDK2, itself cannot be transmitted to the utility meters. To overcome this problem the head-end system, HES, transmits a command data message, CDM, to the utility meter, 102, requesting the utility meter to also derive the new key derivation key, KDK2, identical to the new key derivation key, KDK2, derived at the server side for this utility meter. In general it is undesired to transfer any key derivation key, KDK, or application key, APP, from the server side to the field side due to risk of compromising the transferred key.

The command data message, CDM, does however need to be protected to secure one or more of authenticity of the command data message, authorization and/or authentication of the head-end system. This is needed to ensure that only authorized entities (head-end systems) can initiate generation of a new key derivation key, KDK2, and replacement of the existing key generation key, KDK1, in the utility meter. Especially the existing key derivation key, KDK1, which may have been compromised, cannot be used for protecting the command data message, CDM. To overcome this problem the command data message, CDM, is secured by use of an activation key, AK, derived from the new key derivation key, KDK2. The activation key is derived using a key derivation function and optionally key generation information or a parameter. The command data message, CDM, may be secured by one or more MAC codes or hash values calculated based on the activation key, AK, whereby it is proven that the sender (head-end system or server side) is in possession of the new key derivation key, KDK2, and is authorized to request the replacement of the key derivation key. As an alternative the activation key, AK, may be included in the command data message, CDM, and in it self provide a prove of possession of the new key derivation key, KDK2, in this way the activation key becomes a MAC code. In the latter case the activation key should preferably not be used for further security measures.

The command data message, CDM, for requesting replacement of an existing key derivation key, KDK1, with a new key derivation key, KDK2, comprises the key-generation information, KGI, and an authentication code, CDM-AC, or alternatively the activation key, AK. The request for replacing the key may be explicit or implicit e.g. simply an identifier of the command data message, CDM, or a parameter in the command data message may be interpreted as a request. These data does not need to be kept confidential and may be sent as clear text. The command data message may or may not be encrypted. The key-generation information, KGI, comprised in the command data message, CDM, is identical to the key-generation information used at the server side, SS, for deriving the new key derivation key, KDK2, or at least identical information can be derived from the command data message. The authentication code, CDM-AC, is calculated based on the activation key, AK, which is derived based on the new key derivation key, KDK2, as described above. The authentication code, CDM-AC, or alternatively the activation key, AK, is used for verifying one or more of the authenticity of the command data message, CDM, authorization/authentication of the head-end system, HES, or server side, SS. In other words the authentication code, CDM-AC, or alternatively the activation key, AK, provides a proof that the entity generating the command data message, CDM, was in possession of the new key derivation key, KDK2. The authentication code, CDM-AC, may comprise one or more authentication codes which are used for providing the abovementioned different aspects of security. The command data message is indirectly secured based on the disaster recovery key, DRK, in that the authentication code is calculated based on the activation key, AK, which is derived based on the new key derivation key, KDK2, and the new key derivation key, KDK2, is derived based on at least the key-generation information. This means that only an entity or collection of entities having access to the disaster recovery key can derive a new key derivation key, KDK2, and generate a command data message with a correct authentication code, CDM-AC, requesting replacing an existing key generation key, KDK1, with a new key generation key, KDK2. Any entity having access to the specific new key derivation key, KDK2, and the key-generation information can generate a command data message, CDM, requesting replacing the existing key derivation key, KDK1, with that specific new key derivation key, KDK2.

The utility meter is arranged to update the existing key derivation key, KDK1, to a new key derivation key, KDK2, in that the following steps are performed after receiving a command data message, CDM, requesting replacement of the existing key derivation key, KDK1, from the head-end system, HES, through the meter communication infrastructure, MCI:

The new key derivation key, KDK2, is derived by inputting to the key derivation function, KDF, of the utility meter at least the disaster recovery key, DRK, stored in the meter and the key-generation information, KGI, comprised in the received command data message, CDM. The new key derivation key, KDK2, derived in the utility meter is identical to the new key derivation key, KDK2, derived at the server side, since the key derivation functions, KDF, used in the utility meter and at the server side are identical and since the parameters input to the key derivation functions i.e. the key-generation information, KGI, and the disaster recovery keys, DRK, DRK, are identical. Since the command data message has not yet been authenticated the existing key derivation key, KDK1, cannot be replaced by the new key derivation key, KDK2, before authentication has been performed.

The activation key, AK, is derived in the meter from the new key derivation key, KDK2. The activation key is only derived correct if the new key derivation key, KDK2, has been correctly derived. The activation key, AK, derived in the utility meter is identical to the activation key, AK, derived at the server side and comprised in the command data message or used for calculation the authentication code, CDM-AC, of the command data message at the server side.

Based on the activation key, AK, derived by the utility meter the authentication code, CDM-AC, for the received command data message, CDM, is recalculated by the utility meter. If the recalculated authentication code, CDM-AC, matches the authentication code received, the command data message has been verified/validated. As an alternative if the command data message, CDM, comprises the activation key, AK, and the received activation key, AK, matches the derived activation key, AK', the command data message has been verified/validated.

If the recalculated authentication code matches the authentication code—or alternatively the derived activation key, AK', matches the activation key—received in the command data message CDM, i.e. the command data message has been verified, the existing key derivation key, KDK1, is replaced with the new key derivation key, KDK2. If the command data message is not correct verified by the utility meter, the existing key derivation key, KDK1, is not replaced by the new key derivation key, KDK2, and the utility meter will continue using the existing key derivation key, KDK1, for deriving application keys.

In case the existing key derivation key, KDK1, is replaced by the new key derivation key, KDK2, the utility meter may optionally automatically recalculate one or more of the application keys, APP, in the utility meter.

The utility meter may optionally be arranged to respond to the command data message, CDM. The response may comprise information such as: data indicating if the existing key derivation key, KDK1, was replaced by the new key derivation key, KDK2; key-generation information, KGI, relating to the existing or the new key-derivation key; one or more authentication codes or any other relevant data.

Combining the abovementioned elements a meter communication infrastructure, MCI, such as a meter reading system, for replacing an existing key derivation key, KDK1, may be provided. The meter communication infrastructure comprises: a server side, SS, comprising a head-end system, HES, and secure environment, SE, and a field side, FS, comprising a plurality of utility meters, 102. The field side, FS, and the server side, SS, are arranged to communicate with each other through the meter communication infrastructure, MCI. Meter reading data, sensor data, surveillance data, command data messages, configuration data, firmware updates etc. may be communicated through the meter communication infrastructure. The server side, SS, head-end system, HES, are configured for secure communication with the field side utility meters using application keys, APK, derived at both the server side and the field side using the key derivation key, KDK. The server side, SS, secure environment, SE, is arranged for storing the disaster recovery key, DRK. As the server side is often accessible through internet and disaster recovery keys for all meters are stored at the server side, the server side secure environment, SE, preferably comprises a hardware secured module. The server side secure environment, SE, may be an offline environment not connected to the internet. When a disaster recovery process is initiated in the meter communication infrastructure, MCI, the server side is configured for deriving a new key derivation key, KDK2, based on the disaster recovery key, DRK, stored in the secure environment, and on the key-generation information. The new key derivation key, KDK2, may be derived in any part of the server side, but is preferably derived in the secured environment, SE. The key-generation information is preferably stored at the server side, but may be acquired from other sources. Further, the server side will communicate a command data message, CDM, as described above, to one or more of the utility meters through the meter communication infrastructure, MCI. The field side utility meters is configured for receiving the command data message, CDM, from the server side. The utility meters will execute the command data message by deriving the new key derivation key, KDK2, identical to the new key derivation key derived at the server side, KDK2, using the disaster recovery key, DRK, stored in the utility meter and based on key-generation information received in the command data message. Further, the utility meter will verify the command data message as described above and if verified replace the existing key derivation key, KD1, with the new key derivation key, KDK2.

The disaster recovery key may be generated using standard Windows FIPS 140-2 level 1 validated random functions. More specifically, the Microsoft System.Security.Cryptography.Aesmanaged library may be used for generating the disaster recovery keys. In one embodiment the keys/disaster recovery key may have an amount of effective entropy of app. 115 bits at a significance level of 1%.

The key derivation function, KDF, used for deriving the key derivation key, KDK, from the disaster recovery key may be HKDF described in IETF RFC5869, ISSN: 2070-1721, May 2010 further specific techniques on key derivation is found in NIST SP 800-56C, April 2018. This same key derivation function and techniques may be used for deriving the application keys, APP, from the key derivation key, KDK.

The meter communication infrastructure, MCI, is to be understood as the entire system comprising HW and SW elements spanning from the meter at the field side, FS, to a plurality of physical or virtual servers at the server side, SS. As stated in the introduction, the meter communication infrastructure, MCI, may also include data repeaters (not shown) for retransmitting or relaying data. The utility meters themselves may also function as repeaters or routers creating a mesh network as a part of the meter communication infrastructure. Cellular networks or other third party networks for communication between server side, SS, and field side, FS, is considered to be a part of the meter communication infrastructure. Data may be transmitted both one-way and two-way between the utility meters and the head-end system. Additionally, data may be transmitted via wired—or wireless connections.

The invention can be implemented by means of hardware, software, firmware or any combination of these. The invention or some of the features thereof can also be implemented as software running on one or more data processors and/or digital signal processors. The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A Method for replacing an existing key derivation key in a utility meter arranged in a meter communication infrastructure for communication with a server side comprising a head-end system, the method comprising the steps of:
    deriving at the server side a new key derivation key based on a disaster recovery key, stored at the server side, and a key-generation information;
    deriving at the server side an activation key from the new key derivation key;
    transmitting from the head-end system to the utility meter a command data message comprising:
        a request for replacing the existing key derivation key with the new key derivation key,
        the key-generation information, and
        the activation key or an authentication code calculated based on the activation key;
    receiving in the utility meter the command data message;
    deriving in the utility meter the new key derivation key based on a copy of the disaster recovery key stored in the utility meter and on the key-generation information comprised in the received command data message;
    deriving in the utility meter the activation key from the new key derivation key;
    verifying in the utility meter the activation key or the authentication code received in the command data message, based on the derived activation key; and
    replacing in the utility meter the existing key derivation key with the new key derivation key when the activation key or authentication code comprised in the received command data message is verified.

2. The method according to claim 1, wherein the server side disaster recovery key is stored in a secure environment.

3. The method according to claim 1, wherein the new derivation key at the server side is derived in the secure environment before being transferred to the head-end system or key management system.

4. The method according to claim 1, wherein the disaster recovery key for use at the server side is stored in a secure environment in form of a hardware security module.

5. A utility meter arranged for communication with a head-end system in a meter communication infrastructure, the utility meter comprising:
    a communication interface for interfacing the meter communication infrastructure;
    a disaster recovery key, stored in a memory of the meter;
    an existing key derivation key; and
    a key derivation function;
    wherein the utility meter is configured to:
        receive a command data message, via the communication interface, wherein the command data message comprises:
            a request for replacing the existing key derivation key with a new key derivation key;
            key-generation information;
            an activation key or an authentication code calculated based on the activation key;
            wherein the activation key is derived based on the new key derivation key, and the new key derivation key is derived based on at least the key-generation information, wherein the new key derivation;
        derive a new key derivation key by inputting to the key derivation function at least the disaster recovery key stored in the utility meter and the key-generation information comprised in the received command data message,
        derive an activation key from the new key derivation key,
        verify the activation key or the authentication code received in the command data message, based on the derived activation key, and
        replace the existing key derivation key with the new key derivation key when the activation key or authentication code comprised in the received command data message is verified.

6. The utility meter according to claim 5, further being arranged for secure communication with the head-end system using application keys derived in the utility meter using the key derivation key.

7. A meter communication infrastructure, such as a meter reading system, for replacing an existing key derivation key, the communication infrastructure comprising:
    a plurality of field side utility meters;
    a server including a processor configured to operate a server side head-end system configured for secure communication with the field side utility meters using application keys derived at both the server side and the field side using the key derivation key; and
    a second server with a server side secure environment for storing a disaster recovery key;
    wherein the server side is configured to derive a new key derivation key based on a disaster recovery key stored in the secure environment, and on a key-generation information; and
    wherein the field side utility meters are configured for receiving a command data message from the head-end system instructing the utility meter to derive a new key derivation key identical to the new key derivation key derived at the server side, using a disaster recovery key stored in the utility meter and based on key-generation information received in the command data message.

8. The meter communication infrastructure according to claim 7, wherein the server side further is configured for acquiring existing key-generation information about the existing key derivation key from the utility meter and deriving the key-generation information for the new key derivation key on at least the acquired existing key-generation information.

9. The meter communication infrastructure according to claim 7, wherein the server side comprises:
    a head-end system configured for building and sending the command data message to the utility meters and/or to acquiring existing key-generation information about the existing key derivation key from the utility meter; and
    a secure environment configured for deriving the new key derivation key.

10. The meter communication infrastructure according to claim 9, wherein the secure environment used for storing the disaster recovery key protected by a hardware security module.

11. The meter communication infrastructure according to claim 7, wherein the utility meter is a utility meter according to claim 5 and the meter communication infrastructure is arranged to perform the method of claim 1.

* * * * *